(12) United States Patent
Ehrhard et al.

(10) Patent No.: US 9,475,539 B2
(45) Date of Patent: Oct. 25, 2016

(54) STEERING STOP FOR BICYCLE HANDLEBARS

(71) Applicants: Jan Ehrhard, Koblenz (DE); Lutz Scheffer, Garmisch-Partenkirchen (DE)

(72) Inventors: Jan Ehrhard, Koblenz (DE); Lutz Scheffer, Garmisch-Partenkirchen (DE)

(73) Assignee: CANYON BICYCLES GMBH, Koblenz (DE)

( * ) Notice: Subject to any disclaimer, the term of this patent is extended or adjusted under 35 U.S.C. 154(b) by 0 days.

(21) Appl. No.: 13/629,069

(22) Filed: Sep. 27, 2012

(65) Prior Publication Data

US 2014/0084563 A1    Mar. 27, 2014

(30) Foreign Application Priority Data

Aug. 27, 2012   (DE) .................. 20 2012 008 119 U

(51) Int. Cl.
   *B62K 1/00*         (2006.01)
   *B62K 21/00*        (2006.01)

(52) U.S. Cl.
   CPC ..................... *B62K 21/00* (2013.01)

(58) Field of Classification Search
   CPC ...... B62K 21/10; B62K 21/08; B62K 21/00; B62J 9/02
   USPC .......................... 280/270, 271, 272
   See application file for complete search history.

(56) References Cited

U.S. PATENT DOCUMENTS

| | | | | |
|---|---|---|---|---|
| 565,718 A * | 8/1896 | Boardman | ................ | 280/271 |
| 576,566 A * | 2/1897 | Foehl | ................ | 280/279 |
| 582,279 A * | 5/1897 | Gold | ................ | 280/272 |
| 591,930 A * | 10/1897 | Plummer | ................ | 280/271 |
| 691,597 A * | 1/1902 | Christiansen | ................ | 280/271 |
| 841,624 A * | 1/1907 | Oaughell | ................ | 280/272 |
| 863,567 A * | 8/1907 | Brierley | ................ | 280/271 |
| 1,132,771 A * | 3/1915 | Handy | ................ | 280/270 |
| 1,799,806 A * | 4/1931 | Thomsen et al. | ................ | 280/279 |
| 2,087,535 A * | 7/1937 | Dall | ................ | 280/272 |
| 2,511,320 A * | 6/1950 | Benson | ................ | 280/279 |
| 3,990,716 A * | 11/1976 | Dows | ................ | 280/271 |
| 4,887,827 A * | 12/1989 | Heggie | ................ | 280/272 |
| 5,102,276 A * | 4/1992 | Gourd | ................ | 411/392 |
| 5,492,033 A * | 2/1996 | Hopey | ................ | 74/551.1 |
| 5,516,133 A * | 5/1996 | Motrenec et al. | ................ | 280/272 |
| 5,813,683 A * | 9/1998 | Kulhawik et al. | ................ | 280/275 |
| 5,927,740 A * | 7/1999 | Hopey | ................ | 280/272 |
| 6,003,890 A * | 12/1999 | Inouye | ................ | 280/270 |
| 6,302,421 B1 * | 10/2001 | Lee | ................ | 280/210 |
| 6,343,806 B1 * | 2/2002 | Lee | ................ | 280/272 |
| 6,471,229 B2 * | 10/2002 | Stewart | ................ | 280/272 |
| 6,802,519 B2 * | 10/2004 | Morgan et al. | ................ | 280/272 |
| 7,625,002 B2 * | 12/2009 | Huang | ................ | 280/272 |
| 8,162,339 B2 * | 4/2012 | James | ................ | 280/231 |
| 8,262,292 B2 * | 9/2012 | Hsieh | ................ | 384/545 |

(Continued)

FOREIGN PATENT DOCUMENTS

DE    202004013166    2/2005
DE    10 2010 056 482 A1    7/2012

*Primary Examiner* — Joseph Rocca
*Assistant Examiner* — Conan Duda
(74) *Attorney, Agent, or Firm* — Ohlandt, Greeley, Ruggiero & Perle, LLP

(57) ABSTRACT

A steering stop for bicycle handlebars, comprising a first stop element adapted to be fixed to the head tube of a bicycle fork, and a second stop element cooperating with the first stop element to limit the steering angle. The second stop element is adapted to be mounted to the bicycle frame, in particular to the top tube of the bicycle frame.

9 Claims, 2 Drawing Sheets

(56) References Cited

U.S. PATENT DOCUMENTS

| | | | |
|---|---|---|---|
| 8,342,546 B2* | 1/2013 | Bryant | 280/87.041 |
| 8,439,385 B2* | 5/2013 | Baron | 280/288.4 |
| 8,550,482 B2* | 10/2013 | Park | 280/272 |
| 8,696,007 B2* | 4/2014 | Jankura et al. | 280/281.1 |
| 2003/0127824 A1* | 7/2003 | Hasegawa et al. | 280/272 |
| 2003/0234508 A1* | 12/2003 | Hanawa et al. | 280/272 |
| 2007/0050047 A1* | 3/2007 | Ragnarsdottlr et al. | 623/24 |
| 2007/0096424 A1* | 5/2007 | Chen | 280/272 |
| 2011/0028238 A1* | 2/2011 | Boyd et al. | 473/342 |
| 2011/0133428 A1* | 6/2011 | Hsieh | 280/276 |
| 2011/0187072 A1* | 8/2011 | Park | B60T 7/102  280/204 |
| 2011/0245931 A1* | 10/2011 | Clausen et al. | 623/47 |
| 2012/0063712 A1 | 3/2012 | Hsieh | |
| 2012/0181769 A1* | 7/2012 | James | 280/231 |

* cited by examiner

STEERING STOP FOR BICYCLE HANDLEBARS

CROSS REFERENCE TO RELATED APPLICATIONS

The present disclosure claims the priority of German Utility Model Application no. DE 20 2012 08 119.5 filed on Aug. 27, 2012, the disclosure of which are incorporated herein in its entirety by reference.

BACKGROUND DISCLOSURE

1. Field of the Disclosure

The disclosure refers to a steering stop for bicycle handlebars.

2. Discussion of the Background Art

In the event of a fall or when a bicycle falls over, there is a risk that parts mounted to the handlebar, such as brake or shift levers collide with the top tube of the bicycle frame and cause damage to the same. In particular with bicycle frames of fiber-reinforced plastic material, such as carbon, this may lead to a complete destruction of the bicycle frame.

A steering stop is known from DE 20 2004 013 166, in which a first stop element is clampingly joined with the head tube of the bicycle fork via an annular clamp above the upper headset. The stop element is thus integrated in a spacer, which defines the handlebar height. This has the drawback that the handlebar cannot be mounted at its lowest position. A second stop element cooperating with the first stop element surrounds the upper bearing seat. There is another drawback in that the two stop elements provide no energy absorption, whereby the forces occurring in the event of a fall, for instance, are induced immediately into the frame, the upper headset or the head tube. Moreover, the corresponding stop elements can be replaced only with considerable effort.

SUMMARY OF THE DISCLOSURE

The present steering stop for bicycle handlebars comprises a first stop element adapted to be fixed to the head tube of a bicycle fork. A second stop element cooperates with the first stop element to limit a steering angle. According to the disclosure, the second stop element is adapted to be mounted to the bicycle frame, in particular to the top tube of the bicycle frame. This is advantageous in that the second stop element can be replaced in a simple manner. In that respect, it is possible, for example, to configure the second stop element such that is will be deformed or even destroyed in the event of a fall, for example. This has the advantage that at least the major part of the energy occurring is absorbed and is not induced into the bicycle frame.

The first stop element is preferably annular in shape and preferably surrounds the head tube. The first stop element may be fixed by clamping. For this purpose, the first stop element preferably has a clamping element. The clamping element may be formed by a slot in the annular stop element in combination with two projections and a clamping means such as a screw. The first stop element may be fixed to the head tube such that the stop element can turn on the head tube. The corresponding frictional energy also helps to absorb energy.

The stop surface of the first or the second stop element is preferably oriented such that clamping a finger is avoided. This can be achieved by the fact that the stop surface forms an angle of more than 90° with respect to the direction of rotation, i.e. with respect to the tangential line to the head tube, in particular an angle of more than 120° and, particularly preferred, of more than 135°. Thereby, it is ensured that a finger situated between the two stop surfaces is pushed out by the stop element.

In a particularly preferred embodiment, the first stop element has two stops. The two stops limit the left or the right steering angle. Possibly, a unique stop can be provided that has a corresponding width or extension, this stop limiting both the left and the right steering angle.

It is further preferred that the first stop element is integrated in the first cover ring of, in particular, the upper headset. The first stop element, which is annular in this embodiment, thus simultaneously forms the cover ring. Thus, the stop element has two functions.

The second stop element, which is arranged in particular at the top tube of the bicycle frame or, particularly preferred, on the upper side of the top tube of the bicycle frame, comprises one, preferably two fixing elements for fixation. Providing two fixing elements has the advantage that a twisting of the second stop element is avoided. For example, pin-like fixing elements can be provided for fixation, which are inserted into recesses in the top tube, where they may lock in, for example.

Preferably, the at least one fixing element has a rated breaking point. In particular, in the event of a large-angle steering movement it is thus ensured that no excessive forces are induced into the top tube of the bicycle frame or the head tube. For the purpose of forming a rated breaking point, the fixing element may, for example, have one or a plurality of notches in its outer circumference. Preferably, the at least one fixing element is at least partly hollow so as to form a rated breaking point. It is particularly preferred that the at least one fixing element is in the form of a hollow screw. This can be realized in a simple manner by trepanning a conventional screw. A fixing element in the form of a screw can simply be threaded into a thread formed in the bicycle frame. With a bicycle frame made from fiber-reinforced plastic material, a threaded bushing may be integrated therein, into which the screw can be threaded.

In a particularly preferred embodiment of the at least one fixing element, the same comprises a tool receptacle in the part extending into the bicycle frame. This allows removing, for example, a sheared or broken fixing element from the bicycle frame in a simple manner. The tool receptacle in a hollow screw may be a tool receptacle formed in the opening thereof, for example, for a cross slot screwdriver. Likewise, a hexagon socket contour may be provided in the opening. With the appropriate tool the sheared or broken piece of the fixing element can then be removed from the bicycle frame in a simple manner. It is thus possible in a simple manner to replace the second stop element, for example, after a fall.

Further, the disclosure refers to a bicycle frame with a bicycle fork. Mounted to the bicycle frame, in particular to the top tube of the bicycle frame, is the second stop element, while the first stop element is mounted to the head tube of the bicycle fork. The two stop elements of the steering stop are configured as described above, preferably advantageously developed.

BRIEF DESCRIPTION OF THE DRAWINGS

A full and enabling disclosure of the present disclosure including the best mode thereof, enabling one of ordinary skill in the art to carry out the disclosure, is set forth in greater detail in the following description, including reference to the accompanying drawing in which.

DESCRIPTION OF THE PREFERRED EMBODIMENTS

Figure 1:
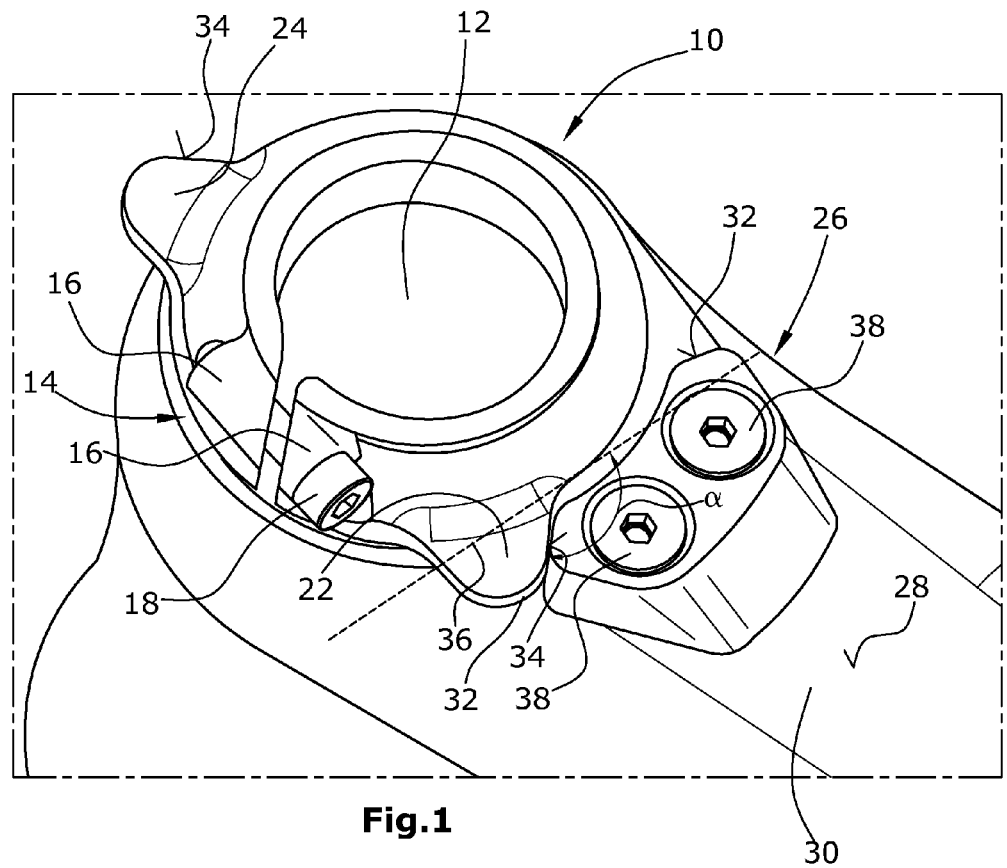
FIG. 1 is a schematic perspective top plan view on a mounted steering stop.

A first stop element 10 of the steering stop is clampingly fastened to a head tube 12. For this purpose, the annular first stop element 10 comprises a clamping element 14. The clamping element 14 has two projections 16 provided on the stop element 10, which can be connected by means of a screw 18. Further, the annular stop element has a clamping slot 20 between the two projections 16.

Further, the first stop element comprises a left stop 22 and a right stop 24 that are preferably formed integrally with the annular stop element 10. The stop 22 limits the steering angle to the left and the stop 24 limits the steering angle to the right. For the purpose of limiting the steering stop, a second stop element 26 is connected with the upper side 28 of the top tube 30 of a bicycle frame. The second stop element, made in particular of plastic material, comprises two stop surfaces 32. The stop surface 34 of the first stop element 22 or the second stop element 26 respectively abut against the stop surfaces 32 in order to limit the steering angle.

In order to avoid a clamping of a finger between the two stop surfaces 32, 34, the stop surface 34 of the stop 22 and 24, respectively, include an angle α of, in particular, 135° with the tangential 36. Thereby, a finger is pushed out from the interstice, provided the stop 22 or 24 is moved in the direction of the stop surface 32 of the second stop element 26. Thereby, clamping a finger is prevented. The stop surfaces 32 are oriented such that a plane abutment of the stop surfaces 32 on the stop surfaces 32 is guaranteed.

In the embodiment illustrated, the second stop element 26 is fixed by means of two fixing elements 38 in the form of screws. In particular with a bicycle frame made of carbon, the two screws 38 are threaded into a fastening element 40 (FIG. 2) with two female threads, configured as a bushing, for example.

Figure 2:
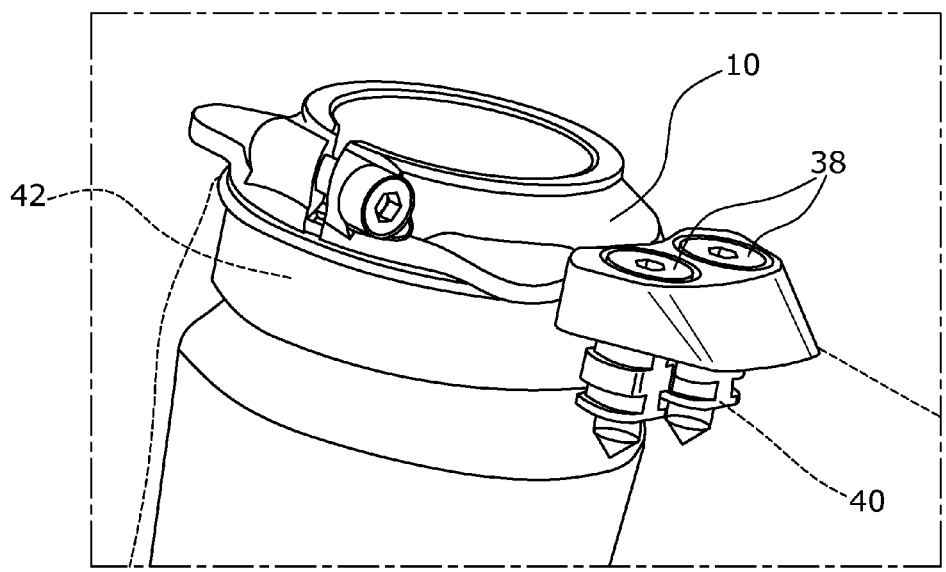
FIG. 2 is a schematic perspective side elevational view of a mounted steering stop, the bicycle frame being illustrated in a transparent manner.

In the illustrated preferred embodiment of the disclosure, the annular first stop element 10 further serves as a cover ring for an upper headset 42 (FIG. 2).

Figure 3:
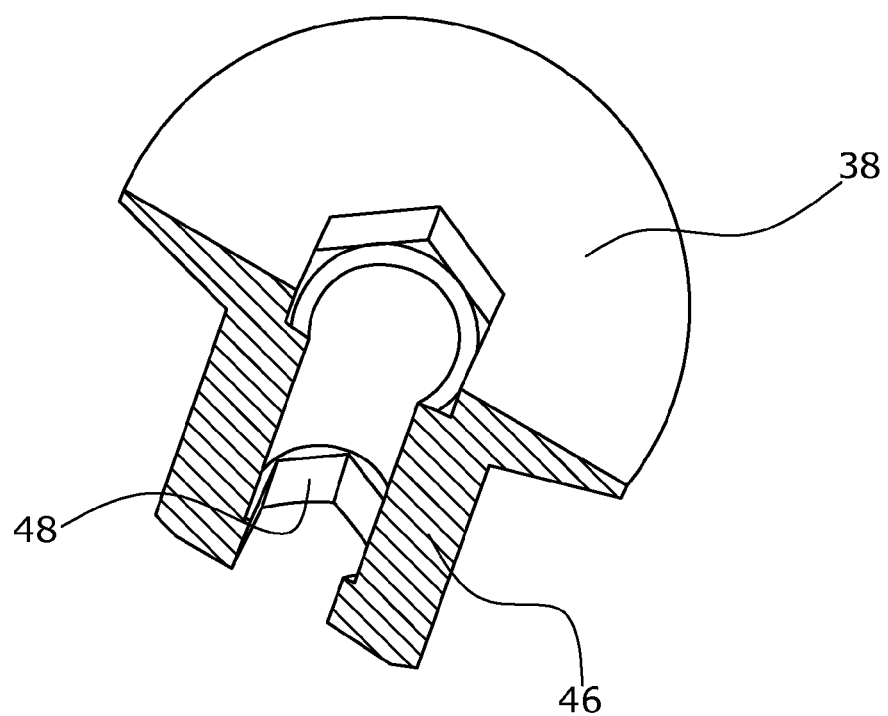
FIG. 3 is a schematic perspective section through a fixing element.

In order to avoid damage to the top tube 30 or the head tube 12 when a strong maximum steering movement is performed, the two screws 38 have a rated breaking point (FIG. 3). The rated breaking point is formed by providing the screws 38 with an opening formed, for example, by trepanning. Thereby, the screw is weakened in the region where it is arranged in the for tube 30, so that this region forms a rated breaking point. In order to be able to remove a sheared lower part of 46 of the screw from the frame 30, a tool receptacle in the form of a hexagonal socket contour 48 is formed in the opening 44 at the region 46 of the screw 38.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

The invention claimed is:

1. A steering stop for bicycle handlebars, comprising:
 a first stop element formed as a headset cover ring, the headset cover ring being integrally formed with a left stop surface and a right stop surface and a clamping slot between the left and right stop surfaces;
 a screw at the clamping slot for clampingly fastening the first stop element to a head tube of a bicycle fork;
 a second stop element having a left stop surface and a right stop surface; and
 a fixing element for fixing the second stop element to an upper side of a top tube of a bicycle frame so that the left and right stop surfaces of the second stop element form a plane abutment with the left and right stop surfaces of the first stop element, respectively, to limit a steering angle,
 wherein the fixing element has a rated breaking point above which the fixing element breaks to ensure that forces above the rated breaking point are not induced into the head tube or the top tube.

2. The steering stop of claim 1, wherein the second stop element is plastic material.

3. The steering stop of claim 2, wherein the second stop element is made of deformable plastic material.

4. The steering stop of claim 1, wherein the fixing element is at least partly hollow in order to form the rated breaking point.

5. The steering stop of claim 1, wherein the fixing element is in the form of a hollow screw.

6. The steering stop of claim 5, further comprising a hexagonal socket contour provided in an opening of the hollow screw.

7. The steering stop of claim 1, wherein the plane abutment is inclined at an angle of more than 90° with respect to a line tangential to the headset cover ring.

8. The steering stop of claim 1, wherein the plane abutment is inclined at an angle of more than 120° with respect to a line tangential to the headset cover ring.

9. The steering stop of claim 1, wherein the plane abutment is inclined at an angle of 135° with respect to a line tangential to the headset cover ring.

* * * * *